United States Patent
Paradise

(10) Patent No.: US 10,718,678 B2
(45) Date of Patent: Jul. 21, 2020

(54) AIRCRAFT ENGINE MULTI-CHANNEL PRESSURE TRANSDUCER

(71) Applicant: Hamilton Sundstrand Corporation, Charlotte, NC (US)

(72) Inventor: Bruce D. Paradise, West Hartford, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 246 days.

(21) Appl. No.: 15/941,156

(22) Filed: Mar. 30, 2018

(65) Prior Publication Data

US 2019/0301955 A1    Oct. 3, 2019

(51) Int. Cl.
| | | |
|---|---|---|
| G01M 15/14 | (2006.01) | |
| G01L 9/02 | (2006.01) | |
| G01L 9/04 | (2006.01) | |
| G01L 9/00 | (2006.01) | |
| G01L 9/06 | (2006.01) | |

(52) U.S. Cl.
CPC ............ *G01L 9/025* (2013.01); *G01L 9/0052* (2013.01); *G01L 9/045* (2013.01); *G01L 9/065* (2013.01); *G01M 15/14* (2013.01)

(58) Field of Classification Search
CPC .................................................... G01M 15/14
USPC ....................................................... 73/112.01
See application file for complete search history.

(56) References Cited

U.S. PATENT DOCUMENTS

| | | | |
|---|---|---|---|
| 5,116,331 A * | 5/1992 | Chapman | G01L 9/0054 338/4 |
| 9,354,132 B2 | 5/2016 | Kang et al. | |
| 2010/0083764 A1 | 4/2010 | Kurtz | |
| 2011/0179879 A1 | 7/2011 | Bentley | |
| 2013/0055821 A1 | 3/2013 | Bentley et al. | |
| 2015/0107367 A1 | 4/2015 | Kosberg et al. | |
| 2017/0343443 A1 | 11/2017 | VanDeWeert et al. | |
| 2018/0026809 A1 | 1/2018 | Benson et al. | |

FOREIGN PATENT DOCUMENTS

RU      2585486 C1      5/2016

OTHER PUBLICATIONS

European Extended Search Report dated Aug. 26, 2019, received for corresponding European Application No. 19166153.7.

* cited by examiner

*Primary Examiner* — Eric S. McCall
(74) *Attorney, Agent, or Firm* — Kinney & Lange, P.A.

(57) ABSTRACT

An aircraft engine pressure transducer includes a first pressure transducer channel and a second pressure transducer channel. The first pressure transducer channel is configured to sense a pressure of the aircraft engine over a first pressure range and a first temperature range. The second pressure transducer channel is configured to sense the pressure of the aircraft engine over a second pressure range and a second temperature range, the second pressure range being a subset of the first temperature range, and the second temperature range being a subset of the first temperature range.

14 Claims, 2 Drawing Sheets

AIRCRAFT ENGINE MULTI-CHANNEL PRESSURE TRANSDUCER

BACKGROUND

Aircraft engine pressure transducers are typically designed to operate over the full range of pressure and temperature of aircraft engines. This limits the accuracy of aircraft engine pressure transducers because the full pressure range is scaled against the transducer electrical output range. The temperature compensation resistors are also scaled against the full possible temperature range, further limiting the accuracy of aircraft engine pressure transducers. This arrangement provides an accuracy that can be insufficient for prognostic health monitoring.

SUMMARY

In one example, an aircraft engine pressure transducer comprises a first pressure transducer channel and a second pressure transducer channel. The first pressure transducer channel is configured to sense a pressure of the aircraft engine over a first pressure range and a first temperature range. The second pressure transducer channel is configured to sense the pressure of the aircraft engine over a second pressure range and a second temperature range, the second pressure range being a subset of the first temperature range, and the second temperature range being a subset of the first temperature range.

In one example, a system comprises an aircraft engine, an engine control unit, and an aircraft engine pressure transducer. The aircraft engine pressure transducer is communicatively coupled to the engine control unit. The aircraft engine pressure transducer is configured to sense a pressure of the aircraft engine. The aircraft engine pressure transducer comprises a first pressure transducer channel, a second pressure transducer channel, and a third pressure transducer channel. The first pressure transducer channel is configured to sense the pressure of the aircraft engine over a first pressure range and a first temperature range. The second pressure transducer channel is configured to sense the pressure of the aircraft engine over the first pressure range and the first temperature range. The third pressure transducer channel is configured to sense the pressure of the aircraft engine over a second pressure range and a second temperature range, the second pressure range being a subset of the first temperature range, and the second temperature range being a subset of the first temperature range.

DETAILED DESCRIPTION

Apparatus, systems, and associated methods relate to aircraft engine pressure transducers. Using the apparatus, systems, and associated methods herein, an additional pressure transducer channel with a narrower pressure and temperature range than existing pressure transducer channels is added to aircraft engine pressure transducers. This allows for more accurate pressure monitoring of aircraft engines without losing the ability to monitor the full pressure over the full temperature range of an aircraft engine. Moreover, the additional pressure transducer channel can be added to existing aircraft engine pressure transducers without increasing the size of the aircraft engine pressure transducer.

Figure 1:
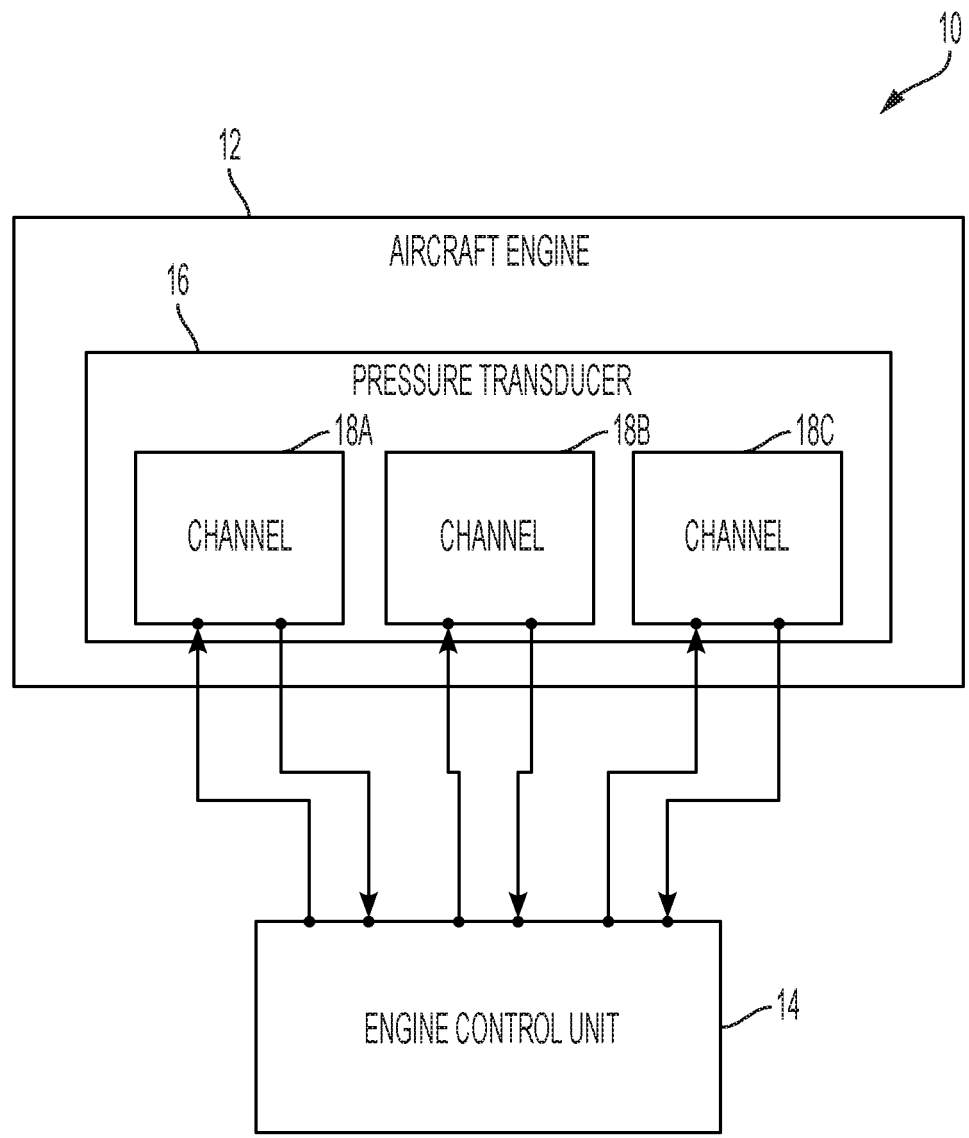
FIG. 1 is a schematic diagram of an aircraft engine three-channel prognostic health monitoring pressure transducer.

FIG. 1 is a block diagram of aircraft engine pressure prognostic health monitoring system 10 including aircraft engine 12 and engine control unit 14. Aircraft engine 12 includes aircraft engine pressure transducer 16. Aircraft engine pressure transducer includes pressure transducer channels 18A-18C.

Pressure transducer channels 18A-18C each receive an excitation signal from engine control unit 14. The excitation signal is a predetermined voltage. Pressure transducer channels 18A-18C provide a pressure signal to engine control unit 14 that varies based upon a pressure of aircraft engine 12. The pressure signal is a voltage that corresponds to the pressure sensed by each of pressure transducer channels 18A-18C.

Figure 2:
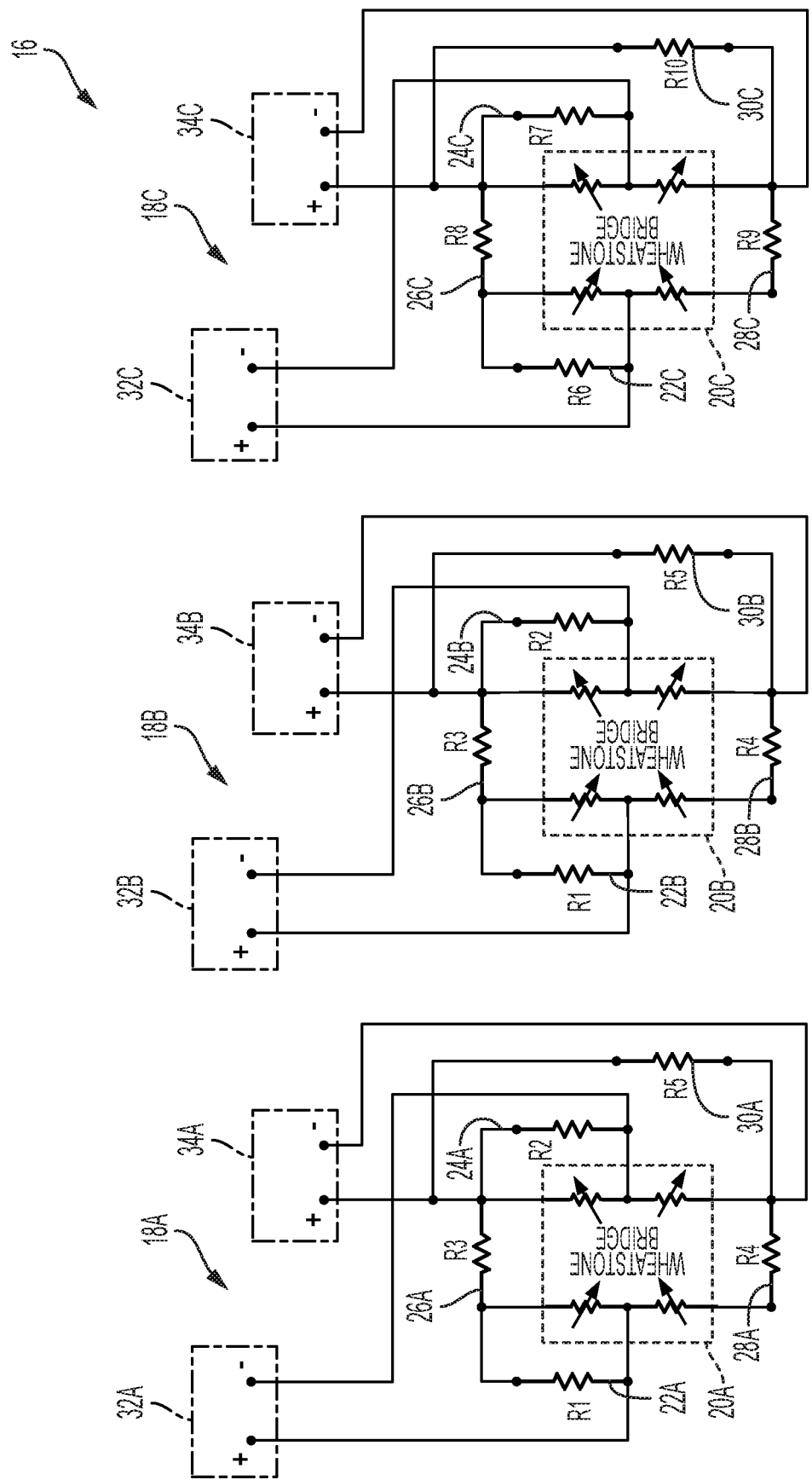
FIG. 2 is a block diagram of an aircraft engine pressure prognostic health monitoring system.

FIG. 2 is a schematic diagram of aircraft engine pressure transducer 16 for prognostic health monitoring including pressure transducer channel 18A, pressure transducer channel 18B, and pressure transducer channel 18C. Pressure transducer channel 18A includes wheatstone bridge 20A; resistors 22A, 24A, 26A, 28A, and 30A; signal output 32A; and excitation input 34A. Pressure transducer channel 18B includes wheatstone bridge 20B; resistors 22B, 24B, 26B, 28B, and 30B; output signal 32B; and excitation input 34B. Pressure transducer channel 18C includes wheatstone bridge 20C; resistors 22C, 24C, 26C, 28C, and 30C; output signal 32C; and excitation input 34C. For purposes of clarity and ease of discussion, aircraft engine pressure transducer 16 is discussed with respect to aircraft engine pressure prognostic health monitoring system 10 of FIG. 1.

Pressure transducer channels 18A-18C receive a voltage from engine control unit 14 at excitation inputs 34A-34C. Excitation inputs 34A-34C provide the excitation signal to wheatstone bridges 20A-20C. Pressure transducer channels 18A-18C provide a pressure signal corresponding to the pressure sensed by wheatstone bridges 20A-20C from signal outputs 32A-32C. Each of wheatstone bridges 20A-20C is mechanically coupled to a glass disk to sense a pressure of aircraft engine 12. In one example, wheatstone bridges 20A-20C are the same wheatstone bridge design such that pressure transducer channels 18A-18C use an identical wheatstone bridge. The glass disk causes the resistance of each of wheatstone bridges 20A-20C to predictably vary with the pressure of aircraft engine 12. The resistance of each of wheatstone bridges 20A-20C acts as a voltage divider to provide the pressure signal. Each of wheatstone bridges 20A-20C is electrically coupled to a separate resistor network comprised of five resistors. Each of resistors 22A-22C, 24A-24C, 26A-26C, 28A-28C, and 30A-30C can comprise an individual resistor, multiple resistors, and/or other electrical components designed to achieve a desired resistance. The individual sensors of each resistor network provide a zero offset, a zero offset temperature compensation, and a span temperature compensation according to the table below:

22A-22C=zero offset temperature compensation resistors
24A-24C=zero offset temperature compensation resistors
26A-26C=zero offset resistors
28A-28C=zero offset resistors
30A-30C=span temperature compensation resistors The zero offset, the zero offset temperature compensation, and the span temperature compensation set an operable pressure range and an operable temperature range for each of pressure transducer channels 18A-18C.

Pressure transducer channels 18A and 18B are redundant pressure transducer channels. Pressure transducer channels 18A and 18B are redundant in order to meet aircraft regulation specifications. The resistors corresponding to the same offset and/or compensation are the same nominal value in pressure transducer channels 18A and 18B. This gives channels 18A and 18B the same zero offset, the same zero offset temperature compensation, and the same span temperature compensation. Pressure transducer channel 18C is configured to provide a zero offset, a zero offset temperature compensation, and a span temperature compensation that is different from channels 18A and 18B. More specifically, pressure transducer channel 18C provides a higher zero offset and a lower full scale output over a smaller temperature range.

In one example, channels 18A and 18B are configured to have a zero offset output of 5 mV at 1.5 absolute pounds per square inch (PSIA) and a full scale output of 50 mV at 63 PSIA over a temperature range of −67° F. to 350° F. A typical pressure transducer channel is ±3% full scale accurate, which results in an accuracy of ±2 PSIA. Channel 18C is configured to have a zero offset output of 5 mV at 8 PSIA and a full scale output of 50 mV at 24 PSIA over a temperature range of 80° F. to 280° F. In one example, channel 18C is designed to ±3% accuracy, which gives channel 18C an accuracy of ±0.5 PSIA. The narrower range of resistor values used for the narrower pressure and temperature ranges allow for designing more accurate pressure transducer channels due to the tolerance of the resistors. In another example, channel 18C is designed to ±1% accuracy, which gives channel 18C an accuracy of ±0.2 PSIA.

Accordingly, implementing techniques of this disclosure, more accurate aircraft engine pressure sensing can be accomplished without losing the full range of aircraft engine pressure sensing. Using a third pressure transducer channel configured to operate over a narrow pressure and temperature span improves the accuracy of aircraft engine pressure sensing within a range of interest. This improves prognostic health monitoring of aircraft engines by providing more accurate data within the range of interest, allowing trend data to have a smaller tolerance and making data aberrations more obvious.

DISCUSSION OF POSSIBLE EMBODIMENTS

The following are non-exclusive descriptions of possible embodiments of the present invention.

An aircraft engine pressure transducer can comprise a first pressure transducer channel configured to sense a pressure of the aircraft engine over a first pressure range and a first temperature range; and a second pressure transducer channel configured to sense the pressure of the aircraft engine over a second pressure range and a second temperature range, the second pressure range being a subset of the first temperature range, and the second temperature range being a subset of the first temperature range.

The aircraft engine pressure transducer of the preceding paragraph can optionally include, additionally and/or alternatively, any one or more of the following features, configurations and/or additional components:

A third pressure transducer channel can be configured to sense the pressure of the aircraft engine over the first pressure range and the first temperature range.

The first pressure transducer channel can comprise a first wheatstone bridge configured to change resistance based upon the pressure of the aircraft engine; and the second pressure transducer channel can comprise a second wheatstone bridge configured to change resistance based upon the pressure of the aircraft engine; and the third pressure transducer channel can comprise a third wheatstone bridge configured to change resistance based upon the pressure of the aircraft engine.

The first pressure transducer channel can comprise a first resistor network electrically coupled to the first wheatstone bridge; the second pressure transducer channel can comprise a second resistor network electrically coupled to the second wheatstone bridge; and the third pressure transducer channel can comprise a third resistor network electrically coupled to the third wheatstone bridge.

The first resistor network can be configured to provide a first pressure zero offset, a first zero offset temperature compensation and a first pressure span temperature compensation to provide the first pressure range and the first temperature range; the second resistor network can be configured to provide a second pressure zero offset, a second zero offset temperature compensation and a second pressure span temperature compensation to provide the second pressure range and the second temperature range; and the third resistor network can be configured to provide the first pressure zero offset, the first zero offset temperature compensation and the first pressure span temperature compensation to provide the first pressure range and the first temperature range.

Resistor values of the first resistor network can be nominally equal to resistor values of the second resistor network.

The first, second, and third pressure transducer channels can be electrically coupled to a single wheatstone bridge.

The first pressure transducer channel can comprise a first resistor network electrically coupled to the single wheatstone bridge; the second pressure transducer channel can comprise a second resistor network electrically coupled to the single wheatstone bridge; and the third pressure transducer channel can comprise a third resistor network electrically coupled to the single wheatstone bridge.

The first resistor network can be configured to provide a first pressure zero offset, a first zero offset temperature compensation and a first pressure span temperature compensation to provide the first pressure range and the first temperature range; the second resistor network can be configured to provide a second pressure zero offset, a second zero offset temperature compensation and a second pressure span temperature compensation to provide the second pressure range and the second temperature range; and the third resistor network can be configured to provide the first pressure zero offset, the first zero offset temperature compensation and the first pressure span temperature compensation to provide the first pressure range and the first temperature range.

The second pressure range can be less than one half of the first pressure range; and the second temperature range can be less than one half of the first temperature range.

A system can comprise an aircraft engine; an engine control unit; and an aircraft engine pressure transducer communicatively coupled to the engine control unit, the aircraft engine pressure transducer configured to sense a pressure of the aircraft engine, the aircraft engine pressure transducer comprises a first pressure transducer channel configured to sense the pressure of the aircraft engine over a first pressure range and a first temperature range; a second pressure transducer channel configured to sense the pressure of the aircraft engine over the first pressure range and the first temperature range; and a third pressure transducer channel configured to sense the pressure of the aircraft engine over a second pressure range and a second temperature range, the second pressure range being a subset of the first temperature range, and the second temperature range being a subset of the first temperature range.

The system of the preceding paragraph can optionally include, additionally and/or alternatively, any one or more of the following features, configurations and/or additional components:

The first pressure transducer channel can comprise a first wheatstone bridge configured to change resistance based upon the pressure of the aircraft engine; and the second pressure transducer channel can comprise a second wheatstone bridge configured to change resistance based upon the pressure of the aircraft engine; and the third pressure transducer channel can comprise a third wheatstone bridge configured to change resistance based upon the pressure of the aircraft engine.

The first pressure transducer channel can comprise a first resistor network electrically coupled to the first wheatstone bridge; the second pressure transducer channel can comprise a second resistor network electrically coupled to the second wheatstone bridge; and the third pressure transducer channel can comprise a third resistor network electrically coupled to the third wheatstone bridge.

The first resistor network can be configured to provide a first pressure zero offset, a first zero offset temperature compensation and a first pressure span temperature compensation to provide the first pressure range and the first temperature range; the second resistor network can be configured to provide the first pressure zero offset, the first zero offset temperature compensation and the first pressure span temperature compensation to provide the first pressure range and the first temperature range; and the third resistor network can be configured to provide a second pressure zero offset, a second zero offset temperature compensation and a second pressure span temperature compensation to provide the second pressure range and the second temperature range.

Resistor values of the first resistor network can be nominally equal to resistor values of the second resistor network.

The first, second, and third pressure transducer channels can be electrically coupled to a single wheatstone bridge.

The first pressure transducer channel can comprise a first resistor network electrically coupled to the single wheatstone bridge; the second pressure transducer channel can comprise a second resistor network electrically coupled to the single wheatstone bridge; and the third pressure transducer channel can comprise a third resistor network electrically coupled to the single wheatstone bridge.

The first resistor network can be configured to provide a first pressure zero offset, a first zero offset temperature compensation and a first pressure span temperature compensation to provide the first pressure range and the first temperature range; the second resistor network can be configured to provide the first pressure zero offset, the first zero offset temperature compensation and the first pressure span temperature compensation to provide the first pressure range and the first temperature range; and the third resistor network can be configured to provide a second pressure zero offset, a second zero offset temperature compensation and a second pressure span temperature compensation to provide the second pressure range and the second temperature range.

The first pressure transducer channel can comprise a first excitation input configured to receive a first excitation signal from the engine control unit; and a first pressure signal output configured to provide, to the engine control unit, a first pressure signal based upon the aircraft engine pressure and the first excitation signal; the second pressure transducer channel can comprise a second excitation input configured to receive a second excitation signal from the engine control unit; and a second pressure signal output configured to provide, to the engine control unit, a second pressure signal based upon the aircraft engine pressure and the second excitation signal; the third pressure transducer channel can comprise a third excitation input configured to receive a third excitation signal from the engine control unit; and a third pressure signal output configured to provide, to the engine control unit, a third pressure signal based upon the aircraft engine pressure and the third excitation signal.

The second pressure range can be less than one half of the first pressure range; and the second temperature range can be less than one half of the first temperature range.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An aircraft engine pressure transducer comprising:
   a first pressure transducer channel comprising:
      a first wheatstone bridge configured to change resistance based upon the pressure of the aircraft engine, the first pressure transducer channel configured to sense the pressure of the aircraft engine over a first pressure range and a first temperature range; and
      a first resistor network electrically coupled to the first wheatstone bridge;
   a second pressure transducer channel comprising:
      a second wheatstone bridge configured to change resistance based upon the pressure of the aircraft engine, the second pressure transducer channel configured to sense the pressure of the aircraft engine over a second pressure range and a second temperature range, the second temperature range being a subset of the first temperature range; and
      a second resistor network electrically coupled to the second wheatstone bridge; and
   a third pressure transducer channel comprising:
      a third wheatstone bridge configured to change resistance based upon the pressure of the aircraft engine, the third pressure transducer channel configured to sense the pressure of the aircraft engine over a third pressure range and a third temperature range; and
      a third resistor network electrically coupled to the third wheatstone bridge;
   wherein:
      the first resistor network is configured to provide a first pressure zero offset, a first zero offset temperature compensation and a first pressure span temperature compensation to provide the first pressure range and the first temperature range;
      the second resistor network is configured to provide a second pressure zero offset, a second zero offset temperature compensation and a second pressure span temperature compensation to provide the second pressure range and the second temperature range; and
      the third resistor network is configured to provide the first pressure zero offset, the first zero offset temperature compensation and the first pressure span temperature compensation to provide the first pressure range and the first temperature range.

2. The aircraft engine pressure transducer of claim 1, wherein resistor values of the first resistor network are nominally equal to resistor values of the second resistor network.

3. The aircraft engine pressure transducer of claim 1, wherein the first, second, and third wheatstone bridges are identical to each other.

4. The aircraft engine pressure transducer of claim 1, wherein:
the second pressure range is less than one half of the first pressure range; and
the second temperature range is less than one half of the first temperature range.

5. An aircraft engine pressure transducer comprising:
a first pressure transducer channel comprising:
a first wheatstone bridge configured to change resistance based upon the pressure of the aircraft engine, the first pressure transducer channel configured to sense the pressure of the aircraft engine over a first pressure range and a first temperature range; and
a first resistor network electrically coupled to the first wheatstone bridge;
a second pressure transducer channel comprising:
a second wheatstone bridge configured to change resistance based upon the pressure of the aircraft engine, the second pressure transducer channel configured to sense the pressure of the aircraft engine over a second pressure range and a second temperature range, the second temperature range being a subset of the first temperature range; and
a second resistor network electrically coupled to the second wheatstone bridge; and
a third pressure transducer channel comprising:
a third wheatstone bridge configured to change resistance based upon the pressure of the aircraft engine, the third pressure transducer channel configured to sense the pressure of the aircraft engine over a third pressure range and a third temperature range; and
a third resistor network electrically coupled to the third wheatstone bridge;
wherein:
the first resistor network is configured to provide a first pressure zero offset, a first zero offset temperature compensation and a first pressure span temperature compensation to provide the first pressure range and the first temperature range;
the second resistor network is configured to provide a second pressure zero offset, a second zero offset temperature compensation and a second pressure span temperature compensation to provide the second pressure range and the second temperature range; and
the third resistor network is configured to provide the first pressure zero offset, the first zero offset temperature compensation and the first pressure span temperature compensation to provide the first pressure range and the first temperature range; and
the first, second, and third wheatstone bridges are identical to each other.

6. A system comprising:
an aircraft engine;
an engine control unit; and
an aircraft engine pressure transducer communicatively coupled to the engine control unit, the aircraft engine pressure transducer configured to sense a pressure of the aircraft engine, the aircraft engine pressure transducer comprising:
a first pressure transducer channel configured to sense the pressure of the aircraft engine over a first pressure range and a first temperature range;
a second pressure transducer channel configured to sense the pressure of the aircraft engine over the first pressure range and the first temperature range; and
a third pressure transducer channel configured to sense the pressure of the aircraft engine over a second pressure range and a second temperature range, the second pressure range being a subset of the first pressure range, and the second temperature range being a subset of the first temperature range.

7. The aircraft engine pressure transducer of claim 6, wherein:
the first pressure transducer channel comprises a first wheatstone bridge configured to change resistance based upon the pressure of the aircraft engine; and
the second pressure transducer channel comprises a second wheatstone bridge configured to change resistance based upon the pressure of the aircraft engine; and
the third pressure transducer channel comprises a third wheatstone bridge configured to change resistance based upon the pressure of the aircraft engine.

8. The aircraft engine pressure transducer of claim 7, wherein:
the first pressure transducer channel further comprises a first resistor network electrically coupled to the first wheatstone bridge;
the second pressure transducer channel further comprises a second resistor network electrically coupled to the second wheatstone bridge; and
the third pressure transducer channel further comprises a third resistor network electrically coupled to the third wheatstone bridge.

9. The aircraft engine pressure transducer of claim 8, wherein:
the first resistor network is configured to provide a first pressure zero offset, a first zero offset temperature compensation and a first pressure span temperature compensation to provide the first pressure range and the first temperature range;
the second resistor network is configured to provide the first pressure zero offset, the first zero offset temperature compensation and the first pressure span temperature compensation to provide the first pressure range and the first temperature range; and
the third resistor network is configured to provide a second pressure zero offset, a second zero offset temperature compensation and a second pressure span temperature compensation to provide the second pressure range and the second temperature range.

10. The aircraft engine pressure transducer of claim 8, wherein resistor values of the first resistor network are nominally equal to resistor values of the second resistor network.

11. The aircraft engine pressure transducer of claim 6, wherein: the first, second, and third wheatstone bridges are identical to each other.

12. The aircraft engine pressure transducer of claim 11, wherein:
the first resistor network is configured to provide a first pressure zero offset, a first zero offset temperature compensation and a first pressure span temperature compensation to provide the first pressure range and the first temperature range;

the second resistor network is configured to provide the first pressure zero offset, the first zero offset temperature compensation and the first pressure span temperature compensation to provide the first pressure range and the first temperature range; and the third resistor network is configured to provide a second pressure zero offset, a second zero offset temperature compensation and a second pressure span temperature compensation to provide the second pressure range and the second temperature range.

13. The aircraft engine pressure transducer of claim 6, wherein:

the first pressure transducer channel comprises:
    a first excitation input configured to receive a first excitation signal from the engine control unit; and
    a first pressure signal output configured to provide, to the engine control unit, a first pressure signal based upon the aircraft engine pressure and the first excitation signal;

the second pressure transducer channel comprises:
    a second excitation input configured to receive a second excitation signal from the engine control unit; and
    a second pressure signal output configured to provide, to the engine control unit, a second pressure signal based upon the aircraft engine pressure and the second excitation signal;

the third pressure transducer channel comprises:
    a third excitation input configured to receive a third excitation signal from the engine control unit; and
    a third pressure signal output configured to provide, to the engine control unit, a third pressure signal based upon the aircraft engine pressure and the third excitation signal.

14. The aircraft engine pressure transducer of claim 6, wherein:

the second pressure range is less than one half of the first pressure range; and the second temperature range is less than one half of the first temperature range.

* * * * *